J. P. COLEMAN.
RAILWAY SIGNAL MECHANISM.
APPLICATION FILED OCT. 1, 1920.

1,405,494.

Patented Feb. 7, 1922.
3 SHEETS—SHEET 3.

INVENTOR
John P. Coleman
BY A. L. Vencill
His ATTORNEY

UNITED STATES PATENT OFFICE.

JOHN P. COLEMAN, OF EDGEWOOD, PENNSYLVANIA, ASSIGNOR TO THE UNION SWITCH & SIGNAL COMPANY, OF SWISSVALE, PENNSYLVANIA, A CORPORATION OF PENNSYLVANIA.

RAILWAY SIGNAL MECHANISM.

1,405,494.  Specification of Letters Patent.  Patented Feb. 7, 1922.

Application filed October 1, 1920. Serial No. 414,064.

*To all whom it may concern:*

Be it known that I, JOHN P. COLEMAN, a citizen of the United States, residing at Edgewood, in the county of Allegheny and State of Pennsylvania, have invented certain new and useful Improvements in Railway Signal Mechanism, of which the following is a specification.

My invention relates to mechanisms for the operation of railway signals, and is particularly well adapted for the operation of semaphores or other indicating devices having three or more indicating positions.

I will describe one form of signal embodying my invention, and will then point out the novel features thereof in claims.

Figure 1:
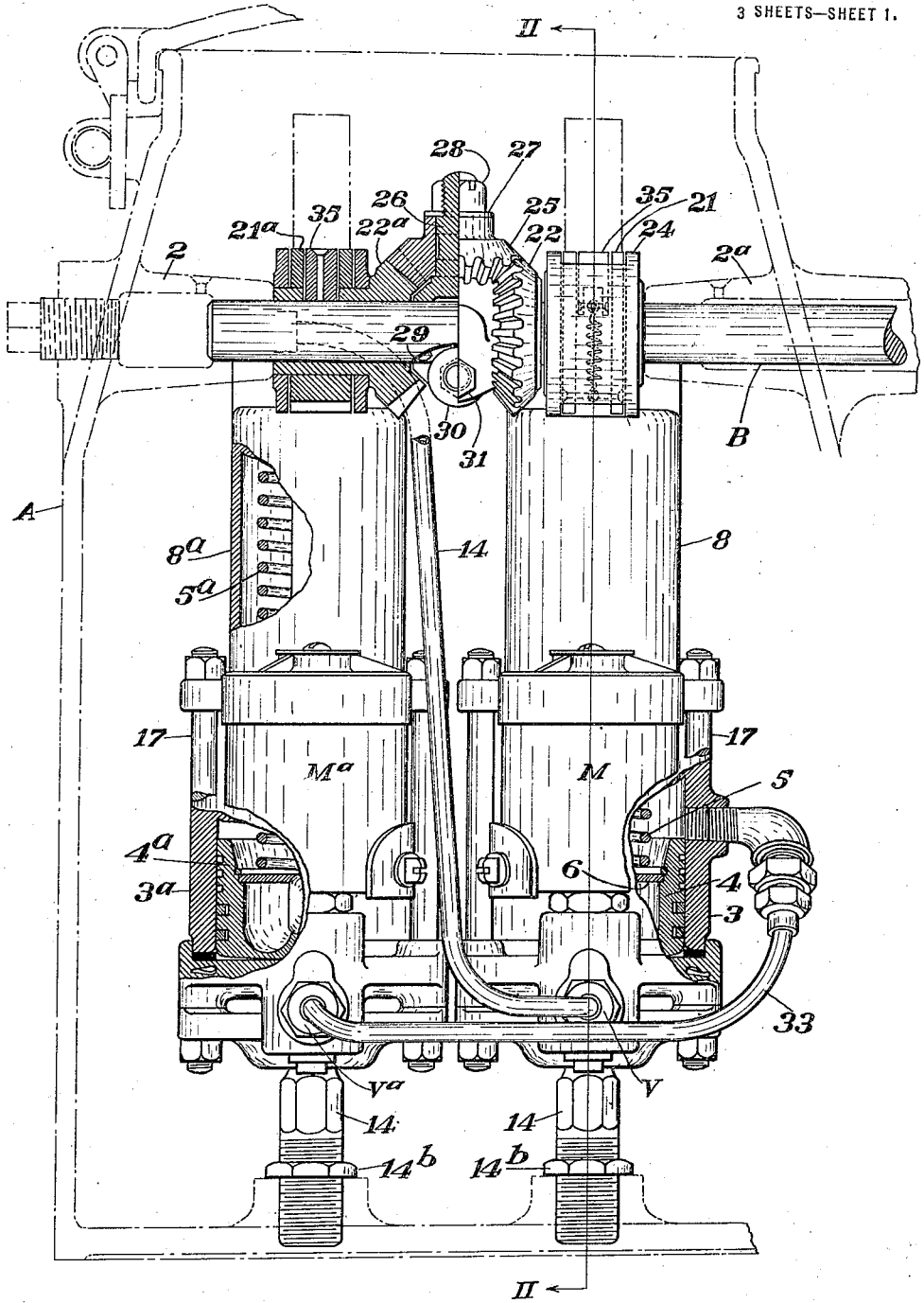
Figure 2:
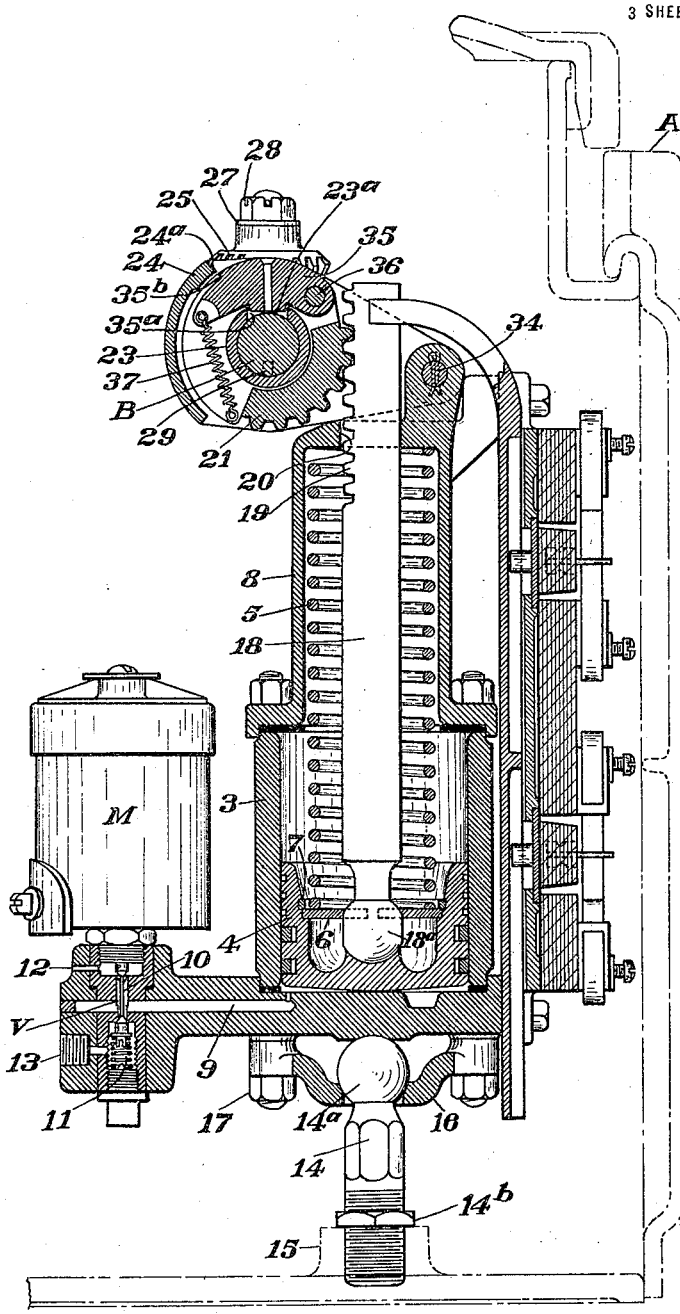
Figure 3:
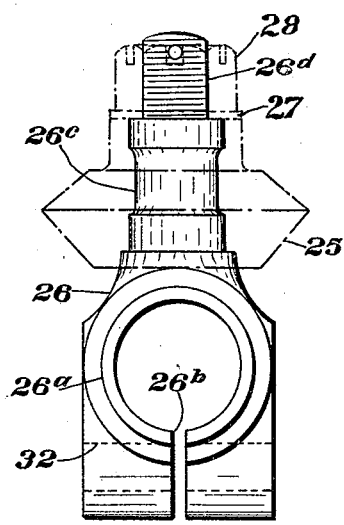
Figure 4:
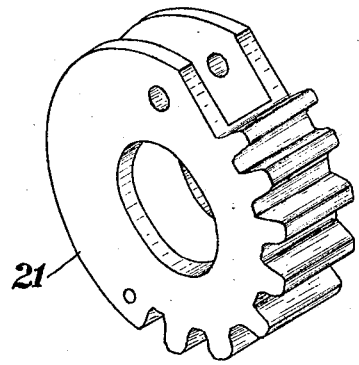
Figure 6:
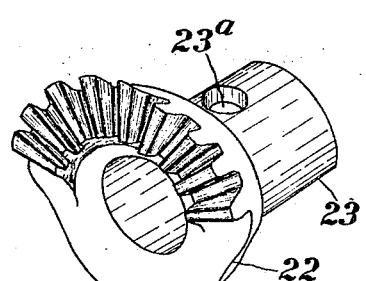
Figure 7:
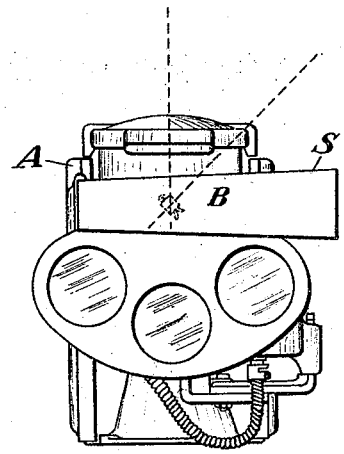
Figure 5:
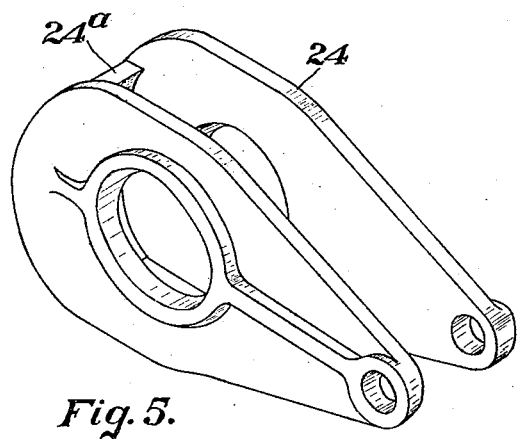

In the accompanying drawings, Fig. 1 is a view showing in side elevation, partly sectioned, one form of mechanism embodying my invention. Fig. 2 is a vertical sectional view on the plane indicated by the line II—II of Fig. 1 and looking in the direction of the arrows. Fig. 3 is a detail view of an operating arm 26 shown in the preceding views. Fig. 4 is a perspective view of a segmental gear 21 shown in the preceding views. Fig. 5 is a perspective view of a housing 24, and Fig. 6 a perspective view of a bevel gear 22, both of which are shown in the assembly views constituting Figs. 1 and 2. Fig. 7 is a view showing the signal and enclosing case in front elevation and including the semaphore, it being understood that the case contains the operating mechanism shown in the preceding views.

Similar reference characters refer to similar parts in each of the several views.

The specific signal shown in the present application is what is known as a "dwarf" signal, although mechanisms embodying my invention are equally well adapted for the operation of signals of any and all other kinds.

Referring first to Figs. 1 and 2 of the drawings, the reference character A designates a case or housing which encloses the entire operating mechanism. Mounted in the walls of the case are two aligned bearings 2 and 2ª which support a shaft B. One end of this shaft extends outside of the case and carries a semaphore S as shown in Fig. 7, which semaphore, as usual, is biased to the horizontal or stop position as shown in solid lines, but is movable to an inclined or caution position, and to a vertical or proceed position the center line of the semaphore while in the two latter positions being indicated by the dash lines in Fig. 7.

The semaphore shaft B is operated by a suitable motor device through the medium of a novel operating mechanism, which device and mechanism I will describe in the order named.

The motor device, in the form shown in the present application, is of the electrically controlled fluid pressure type, although my invention contemplates broadly the provision of a motor device of any appropriate character. This device comprises two parallel cylinders 3 and 3ª containing two pistons 4 and 4ª respectively. Piston 4 is biased downwardly by a spring 5 the lower end of which rests on a plate 6 which is seated on a shoulder formed in the piston and is held in place by a snap ring 7 located in a suitable ring groove also formed in the piston. The upper end of the spring 5 rests against the top of a housing 8 which is bolted to the top of the cylinder 3.

The piston 4ª in cylinder 3ª is biased downwardly by apparatus which is a duplicate of the apparatus associated with piston 4 in all respects.

Adjacent the lower end of the cylinder 3 is a valve V which is controlled by an electromagnet M, and which is connected with the lower end of the cylinder by a pipe 9. When the magnet M is de-energized, the stem 10 of valve V occupies its uppermost position to which it is biased by a spring 11, and the pipe 9 is then open to atmosphere through a port 12. Piston 4 then occupies its lowest position owing to the influence of spring 5. When magnet M is energized, however, valve stem 10 is depressed in opposition to the action of spring 11, so that pipe 9 is then disconnected from atmosphere and is connected with a port 13 which leads to a source of fluid pressure through a pipe 14 (Fig. 1). The fluid pressure thus admitted to cylinder 3 drives piston 4 upwardly in opposition to the action of spring 5.

Cylinder 3ª is provided with a valve Vª and a magnet Mª which are duplicates of the corresponding parts associated with cylinder 3.

Each cylinder is attached to the bottom of the case A through the medium of a stud 14. The lower end of this stud screws into a suitable socket 15 in the case and is locked in the desired position by a nut 14$^b$, while the upper end is in the form of a ball 14$^a$ which is clamped between the bottom of the cylinder and a plate 16 which is attached to the cylinder by the bolts 17. By loosening the nut 14$^b$ and the bolts 17, the stud may be turned to raise or lower the cylinder, whereupon the cylinder is locked in adjusted position by again tightening the nut and bolts.

The operating mechanism between the motor device and the shaft B is as follows: Referring to Fig. 2, the piston 4 is provided with a rod 18 the lower end of which is in the form of a knob 18$^a$. This knob is clamped between the head of the piston and the plate 6, so that the rod and the piston are constrained to move in unison. The rod 18 passes through a hole 20 in the housing 8, so that the rod is restrained to rectilinear motion. The upper end of the rod is provided with a rack 19 which meshes with a segmental gear 21 (see Fig. 4), and this gear in turn is mounted on the hub 23 of a bevel gear 22 (see Fig. 6) which is mounted to rotate freely on the shaft B. For present purposes I will assume that the segmental gear 21 and the bevel gear 22 are one integral unit, although as will appear hereinafter these two parts are provided with mechanism which prevents movement of the semaphore S towards its proceed position by hand.

Also mounted to rotate freely on the shaft B is a second bevel gear 22$^a$ which is similar to gear 22, confronts the same, and is spaced therefrom. The gear 22$^a$ is operatively connected with piston 4$^a$ by mechanism which is similar in all respects to the mechanism between piston 4 and gear 22.

It will be seen from the foregoing that reciprocation of piston 4 or 4$^a$ will cause oscillation of bevel gear 22 or 22$^a$ on the shaft B, but in so far as the apparatus thus far described is concerned will cause no movement of the shaft. To effect the desired operation of the shaft, the two gears 22 and 22$^a$ are connected by a third bevel gear 25 which is mounted to rotate on an operating arm 26, rigidly attached to shaft B. The arm 26, which is shown above Fig. 3, comprises a circular portion 26$^a$ provided with a hole of such size as to fit on the shaft B, and with a slot 26$^b$ cut therethrough. Next to the cylinder portion is a rounded portion 26$^c$, which constitutes a bearing for the beveled gear 25, and the outer end 26$^d$ is threaded to receive a nut 28. To attach the operating arm to the shaft B, the shaft is passed through the hole in the circular portion 26$^a$, and a washer 30 (see Fig. 1) is then inserted in the slot 26$^b$, the shaft being provided with a key-way 29 to accommodate this washer. A bolt 31 is then passed through washer 30 and a hole 32 in the arm 26 to hold the arm rigidly in place on the shaft. The beveled gear 25 may then be placed on the arm 26 and is held in place thereon by a washer 27, which in turn is held in place by the nut 28.

The operation of the parts thus far described, is as follows:

Assuming that both magnets M and M$^a$ are de-energized, both pistons 4 and 4$^a$ will be in their lowest positions, and the semaphore S will then occupy its horizontal or stop position. I will now assume that magnet M, which may be termed the "caution" magnet, becomes energized. This will admit fluid pressure to the lower end of cylinder 3, thereby driving piston 4 upwardly, and so rotating the segmental gear 21 and the beveled gear 22. This will tend to rotate gear 25 in clockwise direction, as viewed from the top, and the latter gear will in turn tend to rotate gear 22$^a$ in clockwise direction, as viewed from the right in Fig. 1. Piston 4$^a$ being at its lowest point, however, gear 22 cannot rotate in the direction specified, and so it follows that gear 25, together with the operating arm 26 will be swung in counter-clockwise direction, as viewed from the right; that is, it will be swung toward the observer, as viewed in Fig. 1. Arm 26 carries with it the shaft B, so that the semaphore S is raised to its inclined or caution position, and is held there as long as magnet M continues to be energized.

I will now assume that while the semaphore is in the caution position, the other magnet M$^a$, which I will term the "proceed" magnet, becomes energized. This will admit fluid pressure to the lower end of cylinder 3$^a$, thereby driving piston 4$^a$ upwardly. This movement of piston 4$^a$ causes gear 22$^a$ to rotate in counter-clockwise direction as the apparatus is viewed in Fig. 2, and this rotation of gear 22$^a$ causes rotation of gear 25 in counter-clockwise direction, as viewed from the top. The rotation of gear 25 in this direction tends to cause rotation of gear 22 in clockwise direction as the apparatus is viewed in Fig. 2, but such rotation is prevented owing to the fact that piston 4 is held in its highest position by fluid pressure at the lower end of cylinder 3. The result is that gear 25 and the operating arm 26 are again swung toward the observer, as viewed in Fig. 1, thereby rotating shaft B to cause the semaphore S to move from the caution to the vertical or proceed position.

Assuming that the semaphore is in the proceed position and that both magnets M and M$^a$ become de-energized, it is apparent that the semaphore will return to its stop position under the influence of gravity and of the forces due to springs 5 and 5$^a$. If, however, magnet M$^a$ becomes de-energized and magnet M remains energized, piston 4$^a$ will drop but piston 4 will remain at the highest point of its stroke, so that the semaphore will return only to the caution position.

As pointed out hereinbefore, the supply of fluid pressure to the caution valve V is received from a suitable source through a pipe 14. The supply for the proceed valve V$^a$, however, is received from the caution cylinder 3 through a pipe 33. This pipe 33 enters the cylinder 3 at such point that fluid pressure is supplied to the pipe only when piston 4 is at the upper end of its stroke. This construction insures that fluid pressure can be supplied to the proceed cylinder only when the caution piston has actually been operated in response to energization of the caution magnet M.

As mentioned hereinbefore, a device is interposed between each segmental gear 21, 21$^a$ and the shaft B to prevent movement of the semaphore towards the proceed position by hand. This device is as follows: Referring to Figs. 2, 5 and 6, the segmental gear 21 is held in place on the hub 23 by a housing 24 which rests on the top of housing 8 and is attached to the latter by a pin 34. The body of the segmental gear 21 is formed with two sections spaced to accommodate a pawl 35 which is pivotally connected at one end of the gear 21 by a pin 36. The pawl is provided with a dog 35$^a$ which lies within an opening 23$^a$ in the gear hub 23. The pawl is also provided with a shoulder 35$^b$ which may at times engage the edge 24$^a$ of housing 24 to prevent counter-clockwise movement of the pawl and the segmental gear, but the pawl is normally held by a spring 37 in such position that the shoulder 35$^b$ passes to the right of the housing edge 24$^a$, so that the housing offers no obstacle to rotation of the pawl and gear.

The operation of the device just described, is as follows: When the semaphore is in the stop position the parts are in the relative positions in which they are shown in Fig. 2, so that the pawl is not in engagement with the edge 24$^a$. Assuming now that piston 4 moves upwardly, it will be apparent that force will be transmitted to the pawl 35 by the pin 36, so that the left-hand end of dog 35$^a$ will engage the left hand end of the recess 23$^a$ and the pawl will remain in the position in which it is shown with relation to the segmental gear 21. Motion will then be transmitted from the segmental gear to the shaft through the medium of the pawl 35, hub 23, and beveled gear 22. I will now assume that when the semaphore is in the stop position an attempt is made to move the semaphore away from this position by the application of force directly to the semaphore. Motion will then be transmitted from the right-hand end of the recess 23$^a$ to the right-hand end of the dog 35$^a$, so that the pawl 35 will be swung upwardly around its pivotal point 36 and the shoulder 35$^b$ will engage with the edge 24$^a$ of the housing 24. This engagement will prevent further rotation of pawl 35 and segmental gear 21, and so it will prevent further movement of the shaft B and of the semaphore S.

A locking device similar to that shown in Figs. 2, 5 and 6, is interposed between the segmental gear 21$^a$ and the beveled gear 22$^a$.

Although I have herein shown and described only one form of mechanism embodying my invention, it is understood that various changes and modifications may be made therein within the scope of the appended claims without departing from the spirit and scope of my invention.

Having thus described my invention, what I claim is:

1. A railway signal comprising a shaft, an operating arm fixed thereto, a beveled gear mounted to rotate on said arm on an axis perpendicular to the axis of said shaft, a second and a third beveled gear mounted to rotate freely on said shaft and located on opposite sides of the first gear and meshing therewith, means for rotating said second and third gears, and a signal device operatively connected with said shaft.

2. A railway signal comprising a shaft, an operating arm fixed thereto, a beveled gear mounted to rotate on said arm on an axis perpendicular to the axis of said shaft, a second and a third beveled gear mounted to rotate freely on said shaft and located on opposite sides of the first gear and meshing therewith, two motor devices for rotating said second and third gears respectively, and a signal device operatively connected with said shaft.

3. A railway signal comprising a shaft, an operating arm fixed thereto, a beveled gear mounted to rotate on said arm on an axis perpendicular to the axis of said shaft, a second and a third beveled gear mounted to rotate freely on said shaft and located on opposite sides of the first gear and meshing therewith, a signal device operatively connected with said shaft and biased to stop position, means for rotating said second gear to move said signal device to caution position, and other means for rotating said third gear to move said signal device to proceed position after it has been moved to the caution position.

4. A railway signal comprising a shaft, an operating arm fixed to said shaft and carrying an operating gear, two driving gears mounted to rotate independently of each other and meshing with the operating gear, means for rotating said driving gears, and a signal device operatively connected with said shaft.

5. A railway signal comprising a shaft, an operating arm fixed to said shaft and carrying an operating gear, two driving gears mounted to rotate independently of each other and meshing with the operating gear, a signal device operatively connected with said shaft and biased to stop position, means for rotating one of said driving gears to move said signal device to caution position, and means for rotating the other driving gear to move the signal device to proceed position after it has been moved to the caution position.

6. A railway signal comprising a shaft, an operating arm fixed to said shaft and carrying an operating gear, two driving gears mounted to rotate independently of each other and meshing with the operating gear, two auxiliary gears operatively connected with said two driving gears respectively, two racks co-acting with said two auxiliary gears respectively, and two fluid pressure motors for operating said two racks respectively.

7. A railway signal comprising a shaft, an operating arm fixed to said shaft and carrying an operating gear, two driving gears mounted to rotate independently of each other and meshing with the operating gear, two auxiliary gears operatively connected with said two driving gears respectively, means for rotating said auxiliary gears, and a signal device operatively connected with said shaft.

8. A railway signal comprising a shaft, an operating arm fixed to said shaft and carrying an operating gear, two driving gears mounted to rotate independently of each other and meshing with the operating gear, two auxiliary gears operatively connected with said two driving gears respectively, means for rotating said auxiliary gears, a signal device operatively connected with said shaft, and means interposed between each driving gear and the corresponding auxiliary gear for preventing rotation of said shaft by force applied directly to the signal device.

9. A railway signal comprising a shaft, an operating arm fixed thereto and carrying an operating gear, two driving gears mounted to rotate freely on said shaft and located on opposite sides of said operating gear and meshing therewith, two auxiliary gears also mounted to rotate freely on said shaft and operatively connected with the two driving gears respectively, means for rotating said auxiliary gears, and a signal device operatively connected with said shaft.

10. A railway signal comprising a shaft, an operating arm fixed thereto and carrying an operating gear, two driving gears mounted to rotate freely on said shaft and located on opposite sides of said operating gear and meshing therewith, two auxiliary gears also mounted to rotate freely on said shaft and operatively connected with the two driving gears respectively, two racks meshing with two auxiliary gears respectively, and two motor devices for reciprocating said racks.

11. A railway signal comprising an indicating device biased to stop position, a caution motor for moving said device from stop to caution position and comprising a cylinder and a piston movable therein, a proceed motor similar to the caution motor for moving said indicating device from caution to proceed position, means for supplying fluid pressure to said caution motor, and means for supplying fluid pressure to said proceed motor from the cylinder of the caution motor after the piston of the caution motor has moved to the position corresponding to the caution position of the indicating device.

12. A railway signal comprising an indicating device biased to stop position, a caution motor for moving said device from stop to caution position and comprising a cylinder and a piston movable therein, a proceed motor similar to the caution motor for moving said indicating device from caution to proceed position, means for supplying fluid pressure to said caution motor, and a pipe leading from the proceed motor to the caution motor and opening into the cylinder of the caution motor at such point as to receive fluid pressure from the caution motor only when the piston of the latter motor is in the position corresponding to the caution position of the indicating device.

13. A railway signal comprising a movable signal device, a shaft for moving said device, two operating mechanisms, means for rotating said shaft in one direction by both of said mechanisms, and other means for preventing such rotation of said shaft except by said mechanisms.

14. A railway signal comprising a movable signal device, a shaft for moving said device, two operating mechanisms, means including beveled gears for rotating said shaft in one direction by both of said mechanisms, and other means for preventing such rotation of said shaft except by said mechanisms.

15. A railway signal comprising a movable signal device, a shaft for moving said device, two operating mechanisms, means interposed between said shaft and each mechanism for rotating the shaft in one direction by both mechanisms, and a device between said shaft and each mechanism for preventing such rotation of the shaft by any force except that applied by the mechanism.

16. A railway signal comprising a shaft, an operating arm fixed thereto, a gear mounted to rotate on said arm on an axis perpendicular to the axis of said shaft, a second and a third gear mounted to rotate freely on said shaft and both meshing with said first gear, a signal device operatively connected with said shaft, means for rotating said second gear to move said signal device to one position, and means for rotating said third gear to move said signal device to another position.

17. A railway signal comprising a shaft, a signal device operatively connected with said shaft and biased to one position, an operating arm fixed to said shaft and carrying an operating gear, two driving gears mounted to rotate independently of each other and meshing with said operating gear, means for rotating one driving gear to move said signal device to another position in opposition to its biasing force, and means for rotating the other driving gear to move said signal to a second position in opposition to its biasing force.

18. A railway signal comprising a shaft, a signal device operatively connected with said shaft and biased to one position, an operating arm fixed to said shaft and carrying an operating gear, two driving gears mounted to rotate independently of each other and meshing with said operating gear, and separate mechanisms for rotating said driving gears to move said signal device to other positions.

19. A railway signal comprising a shaft, a signal device operatively connected with said shaft and biased to one position, an operating arm fixed to said shaft and carrying an operating gear, two driving gears mounted to rotate independently of each other and meshing with said operating gear, and two fluid pressure motors for rotating said two driving gears respectively to move said signal device to other positions.

In testimony whereof I affix my signature in presence of two witnesses.

JOHN P. COLEMAN.

Witnesses:
A. HERMAN WEGNER,
A. H. MARANDA.